US012807108B2

(12) United States Patent
Yoshida et al.

(10) Patent No.: US 12,807,108 B2
(45) Date of Patent: Nov. 24, 2026

(54) PEDESTRIAN PROTECTION SYSTEM

(71) Applicant: DENSO CORPORATION, Kariya-city (JP)

(72) Inventors: Airi Yoshida, Kariya-city (JP); Asei Wakabayashi, Kariya-city (JP); Toshio Hosokawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/236,604

(22) Filed: Jun. 12, 2025

(65) Prior Publication Data

US 2025/0304022 A1 Oct. 2, 2025

Related U.S. Application Data

(63) Continuation of application No. PCT/JP2023/042027, filed on Nov. 22, 2023.

(30) Foreign Application Priority Data

Dec. 15, 2022 (JP) ................................ 2022-200270

(51) Int. Cl.
*B60T 8/1755* (2006.01)
*B60T 7/22* (2006.01)

(52) U.S. Cl.
CPC ............ *B60T 8/17558* (2013.01); *B60T 7/22* (2013.01)

(58) Field of Classification Search
None
See application file for complete search history.

(56) References Cited

FOREIGN PATENT DOCUMENTS

| | | | | |
|---|---|---|---|---|
| JP | 2003226211 | A | * | 8/2003 |
| JP | 2005263121 | A | * | 9/2005 |
| JP | 2007-216933 | A | | 8/2007 |

* cited by examiner

*Primary Examiner* — Shayne M. Gilbertson
(74) *Attorney, Agent, or Firm* — Precision Patents, P.C.

(57) ABSTRACT

When a brake control determination unit instructs a brake control unit to execute full brake control of increasing a vehicle deceleration to a maximum value when detecting that collision between a pedestrian in front of a vehicle and the vehicle is unavoidable. A collision object determination unit detects a weight or height of the pedestrian colliding with the vehicle. When the weight or height of the pedestrian is larger than a predetermined threshold, the brake control determination unit determines to execute brake force reduction control of decreasing a vehicle deceleration from a maximum value for a certain time period in the middle of the full brake control and issue an instruction to the brake control unit. When the weight or height of the pedestrian is smaller than a predetermined threshold, the brake control determination unit determines to continuously execute the full brake control without executing the brake force reduction control.

7 Claims, 9 Drawing Sheets

PEDESTRIAN PROTECTION SYSTEM

CROSS-REFERENCE TO RELATED APPLICATION

The present application is a continuation application of International Application No. PCT/JP2023/042027, filed on Nov. 22, 2023, which claims priority to Japanese Patent Application No. 2022-200270, filed on Dec. 15, 2022. The contents of these applications are incorporated herein by reference in their entirety.

BACKGROUND

Technical Field

The present disclosure relates to a pedestrian protection system that protects a pedestrian having collided with a vehicle.

Background Art

A prevention system that stops a vehicle in response to detecting a possibility of collision between a moving vehicle and a pedestrian and prevents collision with the pedestrian is known. However, even with such a prevention system, there is an accident scene in which collision with a pedestrian is unavoidable even when full brake control of increasing a vehicle deceleration to a maximum value is executed, depending on the vehicle speed or the collision pattern. In that case, collision between a vehicle and a pedestrian causes the leg of the pedestrian to be subject to collision force from a front bumper resulting in the behavior of the body jumping up while rotating, and the pedestrian thereafter falls head first on a road surface, which may lead to a fatal or severe injury accident due to damage by a road surface in which injury is caused from a road surface.

SUMMARY

In the present disclosure, provided is a pedestrian protection system as the following.

The pedestrian protection system includes:

a brake control determination unit configured to instruct a brake control unit to execute full brake control of increasing a vehicle deceleration to a maximum value in response to detecting that collision between a pedestrian in front of a vehicle and the vehicle is unavoidable; and a collision object determination unit configured to detect a weight or height of the pedestrian colliding with the vehicle, in which the brake control determination unit is configured to:

determine to execute brake force reduction control of decreasing a vehicle deceleration from a maximum value for a certain time period in the middle of the full brake control and issue an instruction to the brake control unit, when the weight or height of the pedestrian detected by the collision object determination unit is larger than a predetermined threshold, and determine to continuously execute the full brake control without executing the brake force reduction control, when the weight or height of the pedestrian detected by the collision object determination unit is smaller than a predetermined threshold.

DETAILED DESCRIPTION OF THE PREFERRED EMBODIMENTS

Figure 1:
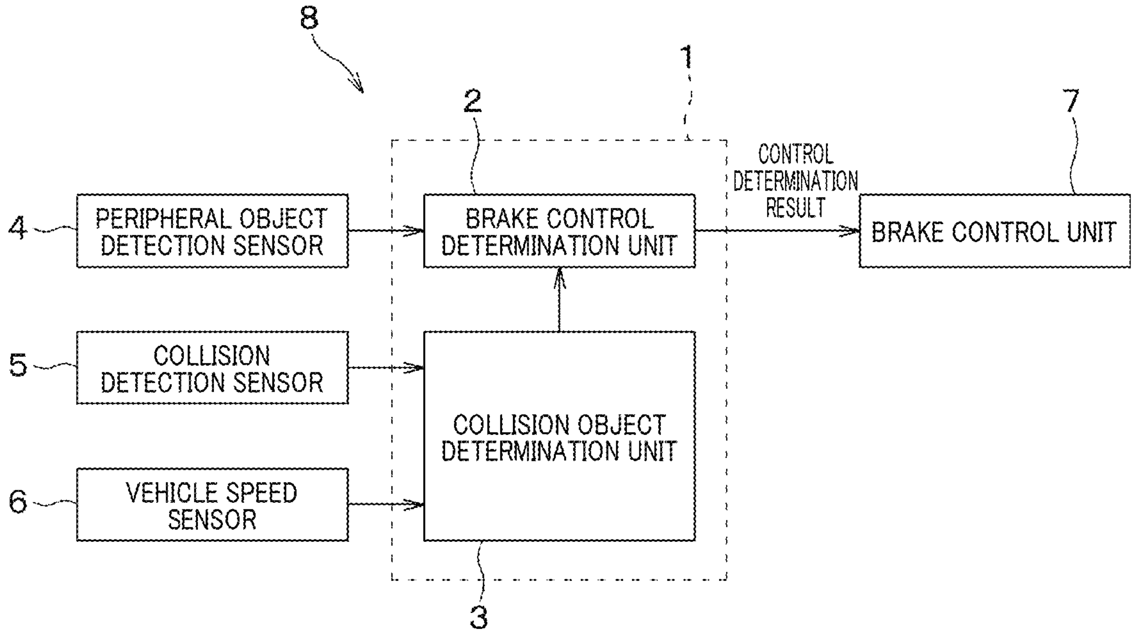
FIG. 1 is a block diagram illustrating a schematic configuration of a vehicle system including a pedestrian protection system according to a first embodiment.

The pedestrian protection apparatus according to PTL 1 actuates an air bag for holding a pedestrian mounted on the front of a vehicle in response to detecting a possibility of collision between a vehicle and a pedestrian in order to ease an impact on the pedestrian having collided with the vehicle when falling on a road surface and to protect the pedestrian from injury caused by a road surface.

PTL 1: JP 2007-216933 A

However, in the pedestrian protection apparatus according to PTL 1, a device such as the air bag needs to be mounted on the vehicle, which increases the number of components and the cost.

An object of the present disclosure is to provide a pedestrian protection system that protects a pedestrian having collided with a vehicle, by brake control of the vehicle.

According to a viewpoint of the present disclosure, there is provided a pedestrian protection system to be mounted on a vehicle together with a brake control unit configured to control driving of a brake circuit of the vehicle, including:

a brake control determination unit configured to instruct the brake control unit to execute full brake control of increasing a vehicle deceleration to a maximum value in response to detecting that collision between a pedestrian in front of a vehicle and the vehicle is unavoidable; and a collision object determination unit configured to detect a weight or height of the pedestrian colliding with the vehicle, in which the brake control determination unit is configured to:

determine to execute brake force reduction control of decreasing a vehicle deceleration from a maximum value for a certain time period in the middle of the full brake control and issue an instruction to the brake control unit, when the weight or height of the pedestrian detected by the collision object determination unit is larger than a predetermined threshold, and determine to continuously execute the full brake control without executing the brake force reduction control, when the weight or height of the pedestrian detected by the collision object determination unit is smaller than a predetermined threshold.

According to this, when a vehicle collides with a pedestrian whose weight or height is larger than a predetermined threshold (hereinafter, appropriately referred to as an "adult-equivalent pedestrian") during execution of the full brake control, the leg of the pedestrian is subject to collision force from the front of the vehicle, and the pedestrian exhibits the behavior of jumping up. In that case, when the brake force reduction control is executed, the vehicle deceleration is mitigated and the vehicle moves forward, causing the body of the pedestrian to be carried on a hood and caught by the hood so that the posture of the pedestrian is retained. Therefore, when the pedestrian falls on a road surface from the hood, the pedestrian is highly likely to safely fall in a manner other than head first on the road surface. Therefore, this pedestrian protection system can protect the pedestrian from injury caused by the road surface by executing the brake force reduction control when the adult-equivalent pedestrian and the vehicle collide.

On the other hand, when a vehicle collides with a pedestrian whose weight or height is smaller than a predetermined threshold (hereinafter, appropriately referred to as a "child-equivalent pedestrian") during execution of the full brake control, the pedestrian exhibits the behavior of being pushed away toward the front side of the vehicle. In that case, the brake force reduction control is not executed, and the vehicle suddenly stops using the full brake control. Therefore, this pedestrian protection system can suddenly stop the vehicle in a case of collision between the child-equivalent pedestrian and the vehicle and prevent the child-equivalent pedestrian from being run over. In this manner, the pedestrian protection system can protect both the adult-equivalent pedestrian and the child-equivalent pedestrian who collide with the vehicle during execution of the full brake control, using the brake control of the vehicle.

Note that a bracketed reference sign attached to each constituent or the like denotes an example of the correspondence relation between the constituent or the like and a specific constituent or the like according to the later-described embodiment.

Hereinafter, embodiments of the present disclosure will be described with reference to the drawings. Note that in the following embodiments, portions that are the same as or equivalent to each other are assigned with the same referential signs, and descriptions thereof will be omitted.

First Embodiment

A first embodiment will be described with reference to the drawings. As illustrated in FIG. 1, a pedestrian protection system 1 of the present embodiment includes a brake control determination unit 2 and a collision object determination unit 3. The pedestrian protection system 1 constitutes a vehicle system 8 that protects a pedestrian, together with a peripheral object detection sensor 4, a collision detection sensor 5, a vehicle speed sensor 6, and a brake control unit 7.

The peripheral object detection sensor 4 is a sensor that detects an object existing in the periphery of a vehicle, and is constituted by, for example, a camera, a radar sensor, an LiDAR sensor, and the like.

One or more cameras are mounted on a vehicle to take a picture of the periphery of a vehicle. An example of the camera to be used is a digital camera utilizing a solid-state image sensor such as a CCD or a CMOS. CCD stands for Charge Coupled Device, and CMOS stands for Complementary Metal Oxide Semiconductor.

A radar sensor emits electric waves such as millimeter waves and measures electric waves (i.e., reflective waves) reflected by an object to detect a distance to the object. A LiDAR sensor measures scattered light to emitted laser light and detects, for example, a distance to an object. LiDAR stands for Light Detection and Ranging or Laser Imaging Detection and Ranging. Note that the peripheral object detection sensor 4 includes at least one of a camera, a radar sensor, a LiDAR sensor, and the like.

Image data captured by a camera as the peripheral object detection sensor 4 as well as information detected by a radar sensor and a LiDAR sensor are input to a brake control determination unit 2. The brake control determination unit 2 is an electronic control device mainly composed of a computer having a processor, a memory, and the like.

The brake control determination unit 2 detects an object including a pedestrian existing in the periphery of a vehicle based on information input from the peripheral object detection sensor 4. When the brake control determination unit 2 determines that collision between a pedestrian in front of a vehicle and the vehicle is unavoidable, it instructs the brake control unit 7 to execute full brake control of increasing a vehicle deceleration to a maximum value.

The brake control unit 7 is also an electronic control device mainly composed of a computer having a processor, a memory, and the like. The brake control unit 7 controls driving of an unillustrated brake circuit (for example, a brake hydraulic circuit or an electric brake circuit) and the like mounted on a vehicle. In response to receiving an instruction to execute the full brake control from the brake control determination unit 2, the brake control unit 7 controls driving of the brake circuit to maximize brake force (i.e., braking force) of a vehicle such that the vehicle deceleration becomes a maximum value to suddenly stop the vehicle. In this manner, the peripheral object detection sensor 4, the brake control determination unit 2, and the brake control unit 7 constitute a prevention system to prevent collision between a vehicle and a pedestrian. However, even when the full brake control is executed by such a prevention system, there is an accident scene in which collision with a pedestrian is unavoidable depending on the vehicle speed or the collision pattern. The pedestrian protection system 1 and the vehicle system 8 according to the present embodiment can cope with such an accident scene.

The collision detection sensor 5 is a sensor that detects collision force of an object colliding with the front (for example, the front bumper) of a vehicle. Although unillustrated, the collision detection sensor 5 is constituted by, for example, a tube extending in the vehicle width direction between a front bumper cover and a bumper reinforcement and a pressure sensor for detecting a pressure change of air charged in the tube. The collision detection sensor 5 detects a difference in tube deformation caused by the weight and the speed of a collision object as a difference in sensor output. The collision detection sensor 5 is not limited to the above-described configuration, and may be configured by, for example, one or more acceleration sensors or one or more pressure sensors disposed to a front bumper.

The vehicle speed sensor 6 is a sensor to output a signal corresponding to the running speed of a vehicle. Information detected by the collision detection sensor 5 and the vehicle speed sensor 6 is input to a collision object determination unit 3.

The collision object determination unit 3 is also an electronic control device mainly composed of a computer having a processor, a memory, and the like. The collision object determination unit 3 calculates the mass of an object having collided with a vehicle according to a mathematical formula or map previously stored in a memory, based on the collision force at collision of an object detected by the collision detection sensor 5 and the vehicle speed at collision detected by the vehicle speed sensor 6. Therefore, when a vehicle and a pedestrian collide, the collision object determination unit 3 calculates the weight of the pedestrian having collided with the vehicle. Specifically, the collision object determination unit 3 calculates that the weight of the pedestrian to be larger as the collision force is larger and as the vehicle speed at collision is slower. Further, the collision object determination unit 3 can estimate the height of the pedestrian from the detected weight of the pedestrian, according to a mathematical formula or map previously stored in a memory. In general, the height of a pedestrian is estimated higher as the weight of a pedestrian is heavier. The information (specifically, the weight or height of the pedestrian) calculated by the collision object determination unit 3 is input to the brake control determination unit 2.

When the weight or height of the pedestrian calculated by the collision object determination unit 3 is larger than a predetermined threshold, the brake control determination unit 2 determines to execute brake force reduction control of decreasing the vehicle deceleration from the maximum value for a certain time period in the middle of the full brake control and issues an instruction to the brake control unit 7. In response to receiving an instruction to execute the brake force reduction control from the brake control determination unit 2, the brake control unit 7 controls the driving of a brake circuit to reduce the brake force of the vehicle such that the vehicle deceleration is decreased from the maximum value. On the other hand, when the weight or height of the pedestrian calculated by the collision object determination unit 3 is smaller than a predetermined threshold, the brake control determination unit 2 determines to continuously execute the full brake control without executing the brake force reduction control. In the following description, a pedestrian whose weight or height is larger than a predetermined threshold is appropriately referred to as an "adult-equivalent pedestrian". On the other hand, a pedestrian whose weight or height is smaller than a predetermined threshold is appropriately referred to as a "child-equivalent pedestrian". Note that a weight being larger than a predetermined threshold indicates a weight being heavier than a predetermined threshold, and a weight being smaller than a predetermined threshold indicates a weight being lighter than a predetermined threshold. A height being larger than a predetermined threshold indicates a height being higher than a predetermined threshold, and a height being smaller than a predetermined threshold indicates a height being lower than a predetermined threshold.

Figure 2A:
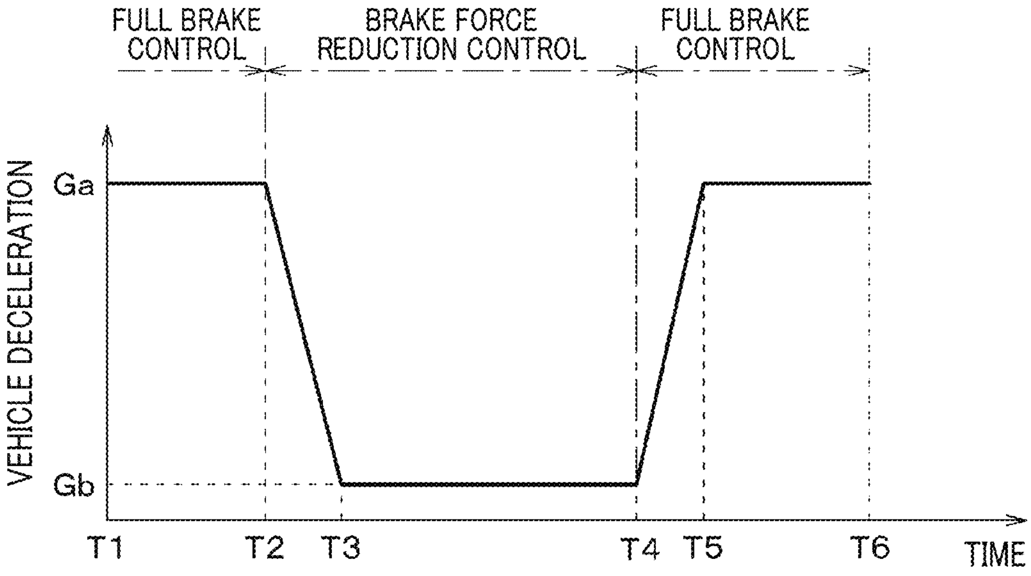
FIG. 2A is a graph illustrating a vehicle deceleration when brake force reduction control is executed in the middle of full brake control.
Figure 2B:
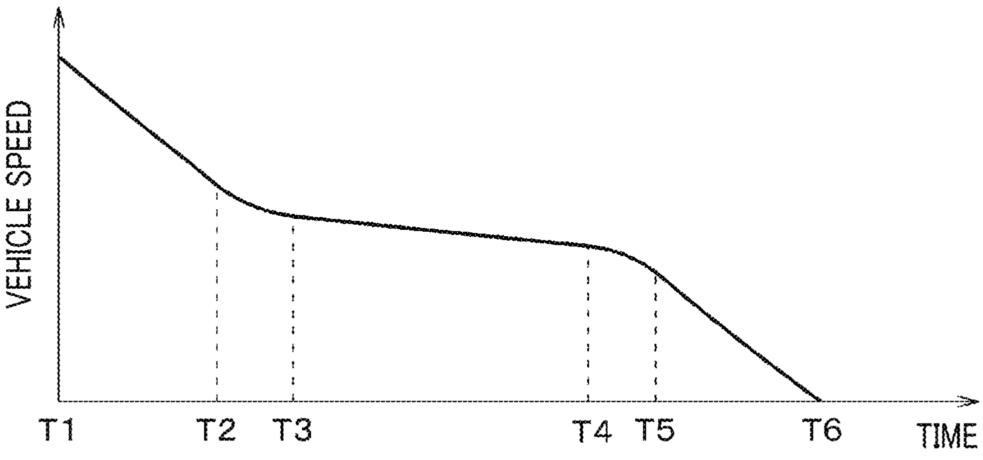
FIG. 2B is a graph illustrating a vehicle speed in FIG. 2A.

Here, FIG. 2A and FIG. 2B illustrate an example of a vehicle deceleration and a vehicle speed when the brake force reduction control was executed in the middle of the full brake control.

In FIG. 2A and FIG. 2B, the full brake control is executed from time T1 to T2. In the full brake control, the vehicle deceleration is maximum value Ga, as shown in from time T1 to T2 of FIG. 2A. Therefore, as shown in from time T1 to T2 of FIG. 2B, the vehicle speed rapidly decreases.

When the brake force reduction control is started at time T2, as shown in from time T2 to T3 of FIG. 2A, the vehicle deceleration is eased, and thereafter the vehicle deceleration keeps value Gb, which is smaller than the value during the full brake control, until time T4. Therefore, as shown in from time T2 to T4 of FIG. 2B, the vehicle speed decreases more slowly in the brake force reduction control than during the full brake control.

When the brake force reduction control ends at time T4, and the full brake control is executed again, as shown in from time T4 to T5 of FIG. 2A, the vehicle deceleration increases, and thereafter the vehicle deceleration keeps maximum value Ga until time T6 when the vehicle stops. Therefore, as shown in from time T4 to T6 of FIG. 2B, the vehicle speed rapidly decreases and reaches 0 at time T6.

Next, in the pedestrian protection system 1 of the first embodiment, a behavior of an adult-equivalent pedestrian H1, when the pedestrian H1 and a vehicle V1 collide during execution of the full brake control, and the brake force reduction control is executed, will be descried with reference to FIG. 3A to FIG. 3D.

Figure 3A:
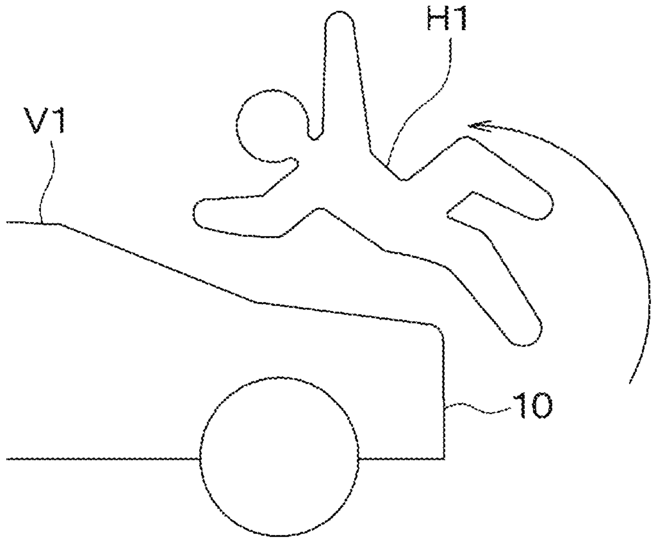
FIG. 3A is an explanation diagram illustrating a behavior of an adult-equivalent pedestrian having collided with a vehicle in the pedestrian protection system according to the first embodiment.

FIG. 3A illustrates a state immediately after an adult-equivalent pedestrian H1 and a vehicle V1 collided. The collision between the adult-equivalent pedestrian H1 and the vehicle V1 causes the leg of the pedestrian H1 to be subject to collision force from a vehicle front portion 10 resulting in the behavior of the body jumping up while rotating.

Figure 3B:
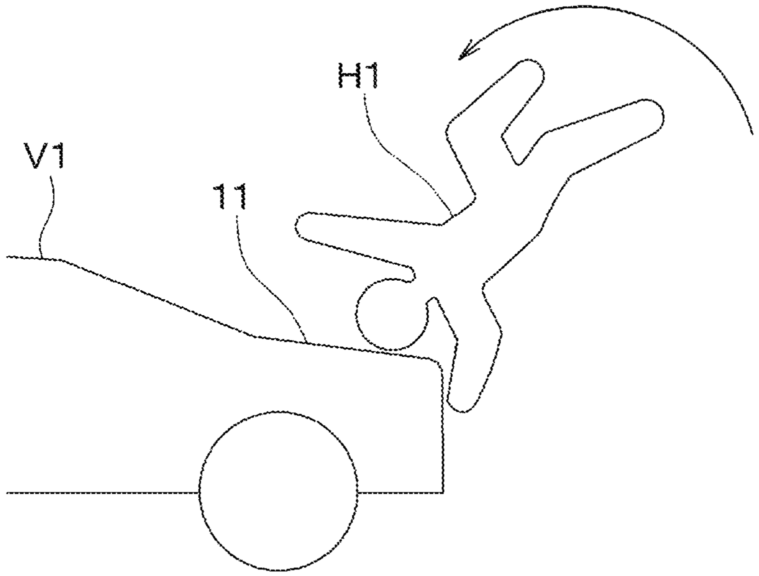
FIG. 3B is an explanation diagram illustrating a behavior of the adult-equivalent pedestrian subsequent to FIG. 3A.

Subsequently, as illustrated in FIG. 3B, the head of the pedestrian H1 collides with a hood 11 of the vehicle V1. A time to start the brake force reduction control is set to a time at which the head of the pedestrian H1 is estimated to collide with the hood 11 of the vehicle V1.

Figure 3C:
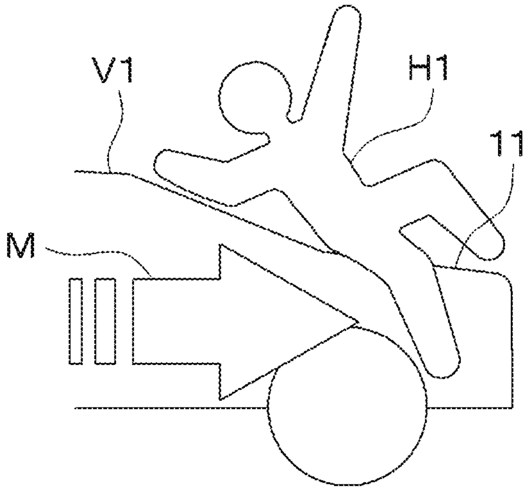
FIG. 3C is an explanation diagram illustrating a behavior of the adult-equivalent pedestrian subsequent to FIG. 3B.

In response to the start of the brake force reduction control, the vehicle V1 moves forward while the vehicle deceleration is eased, as illustrated by arrow M of FIG. 3C. Therefore, as illustrated in FIG. 3C, the body of the pedestrian H1 is carried on the hood 11 and caught by the hood 11 so that the posture of the pedestrian H1 is retained.

Figure 3D:
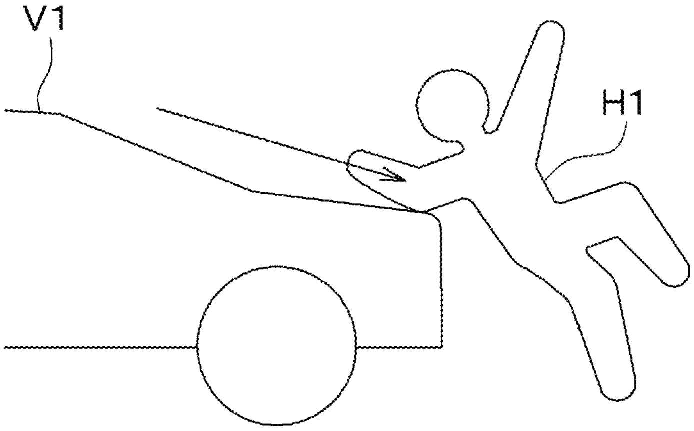
FIG. 3D is an explanation diagram illustrating a behavior of the adult-equivalent pedestrian subsequent to FIG. 3C.

Thereafter, when the pedestrian H1 falls on a road surface from the hood 11 as illustrated in FIG. 3D, the pedestrian H1 is highly likely to safely fall in a manner other than head first, preferably leg first, on the road surface. A time to end the brake force reduction control and execute the full brake control again is set to a time at which the weight of the pedestrian H1 is estimated to be no longer on the hood 11 or when the body of the pedestrian H1 is estimated to move downward from the hood 11. Ending the brake force reduction control and executing the full brake control again prevents the pedestrian H1 falling on the road surface from being run over.

Subsequently, when a child-equivalent pedestrian H2 and a vehicle V1 collide during execution of the full brake control in the pedestrian protection system 1 of the first embodiment, the behavior of the pedestrian H2 will be described with reference to FIG. 4A and FIG. 4B.

Figure 4A:
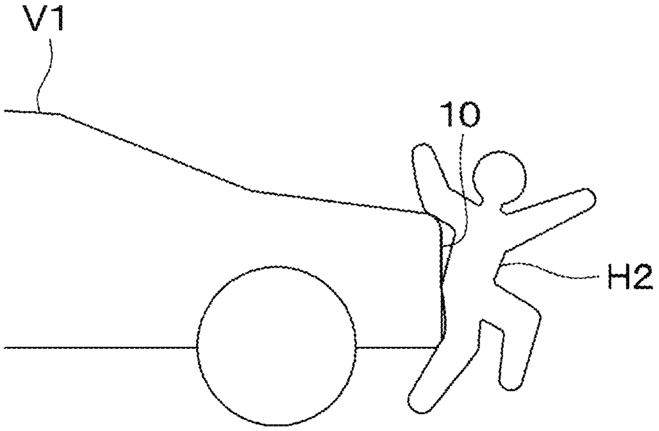
FIG. 4A is an explanation diagram illustrating a behavior of a child-equivalent pedestrian having collided with a vehicle in the pedestrian protection system according to the first embodiment.
Figure 4B:
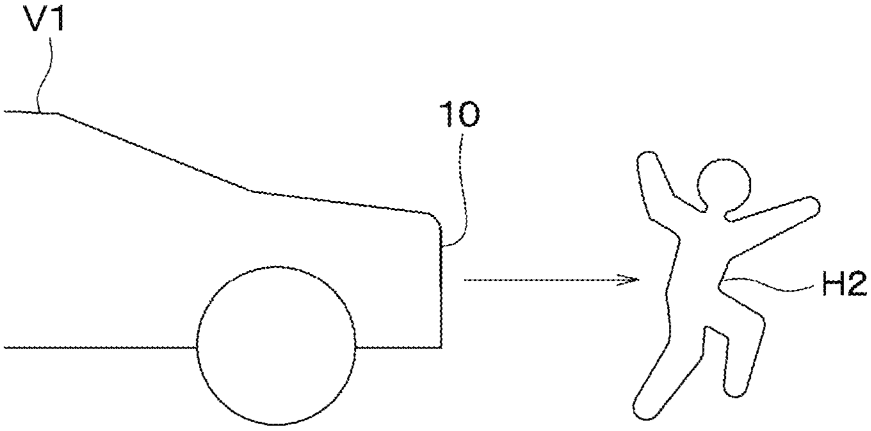
FIG. 4B is an explanation diagram illustrating a behavior of the child-equivalent pedestrian subsequent to FIG. 4A.

FIG. 4A illustrates a state in which a child-equivalent pedestrian H2 and a vehicle V1 collide. The collision between the child-equivalent pedestrian H2 and the vehicle V1 causes the entire body of the pedestrian H2 to be subject to collision force from a vehicle front portion 10 resulting in the behavior of the body being pushed away toward the front side of the vehicle, as illustrated in FIG. 4B. Therefore, when the child-equivalent pedestrian H2 and the vehicle V1 collide, the full brake control is continuously executed without executing the brake force reduction control. This can prevent the pedestrian H2 having moved toward the front side of the vehicle from being run over.

Here, for comparison with the above-described pedestrian protection system 1 of the first embodiment, a pedestrian protection system of a comparative example will be described. The pedestrian protection system of a comparative example can execute only the full brake control and does not execute the brake force reduction control.

Figure 5A:
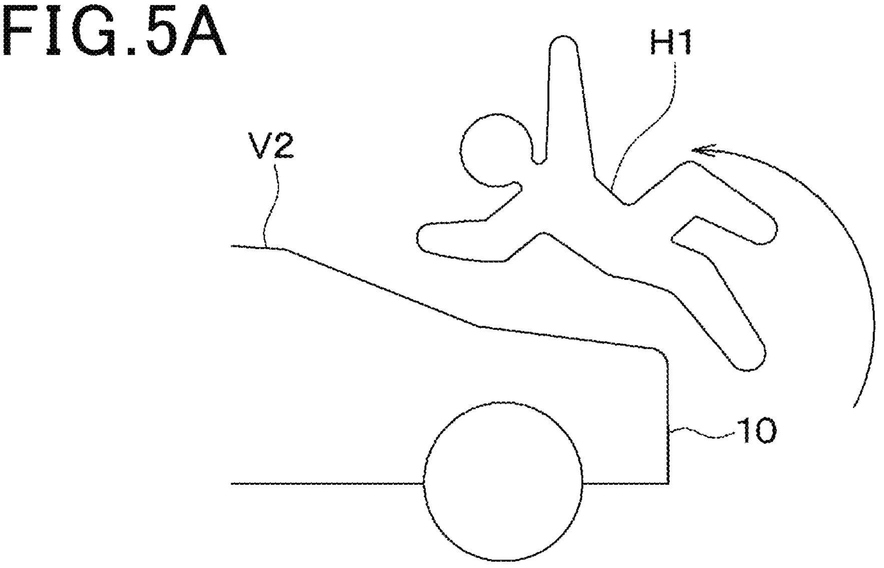
FIG. 5A is an explanation diagram illustrating a behavior of an adult-equivalent pedestrian having collided with a vehicle in a pedestrian protection system according to a comparative example.

FIG. 5A illustrates a state immediately after an adult-equivalent pedestrian H1 and a vehicle V2 collided. As described above, the collision between the adult-equivalent pedestrian H1 and the vehicle V2 causes the leg of the pedestrian H1 to be subject to collision force from a vehicle front portion 10 resulting in the behavior of the body jumping up while rotating.

Figure 5B:
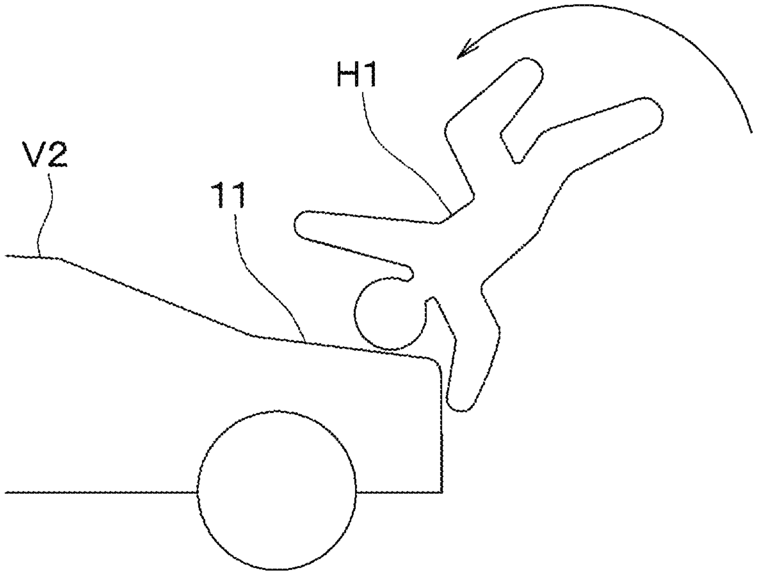
FIG. 5B is an explanation diagram illustrating a behavior of the adult-equivalent pedestrian subsequent to FIG. 5A.

Subsequently, as illustrated in FIG. 5B, the head of the pedestrian H1 collides with a hood 11 of the vehicle V2. In the comparative example, the full brake control is continuously executed thereafter, so that the vehicle V2 suddenly stops. Therefore, in the comparative example, the hood 11 of the vehicle V2 does not catch the body of the pedestrian H1.

Figure 5C:
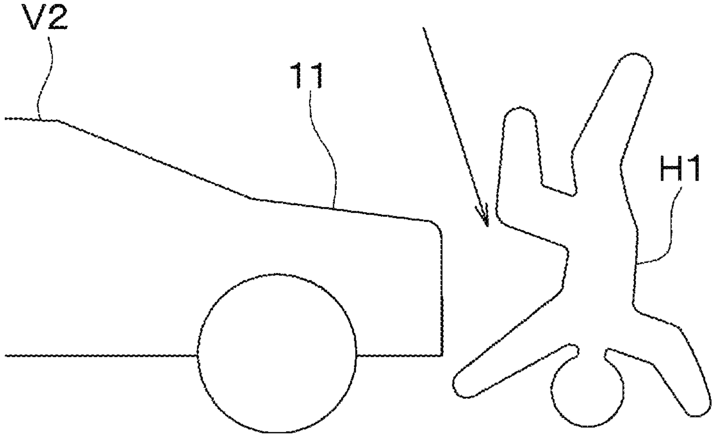
FIG. 5C is an explanation diagram illustrating a behavior of the adult-equivalent pedestrian subsequent to FIG. 5B.

Therefore, as illustrated in FIG. 5C, the pedestrian H1 falls head first on a road surface, which may lead to a fatal or severe injury accident due to road surface injury in which the pedestrian H1 is injured by the road surface.

In this manner, according to the pedestrian protection system of a comparative example, road surface injury may occur when the adult-equivalent pedestrian H1 and the vehicle V2 collide during execution of the full brake control. On the other hand, according to the above-described pedestrian protection system 1 of the first embodiment, the brake force reduction control is executed under a certain condition, so that both the adult-equivalent pedestrian H1 and the child-equivalent pedestrian H2 having collided with the vehicle V1 during execution of the full brake control can be protected.

Figure 6:
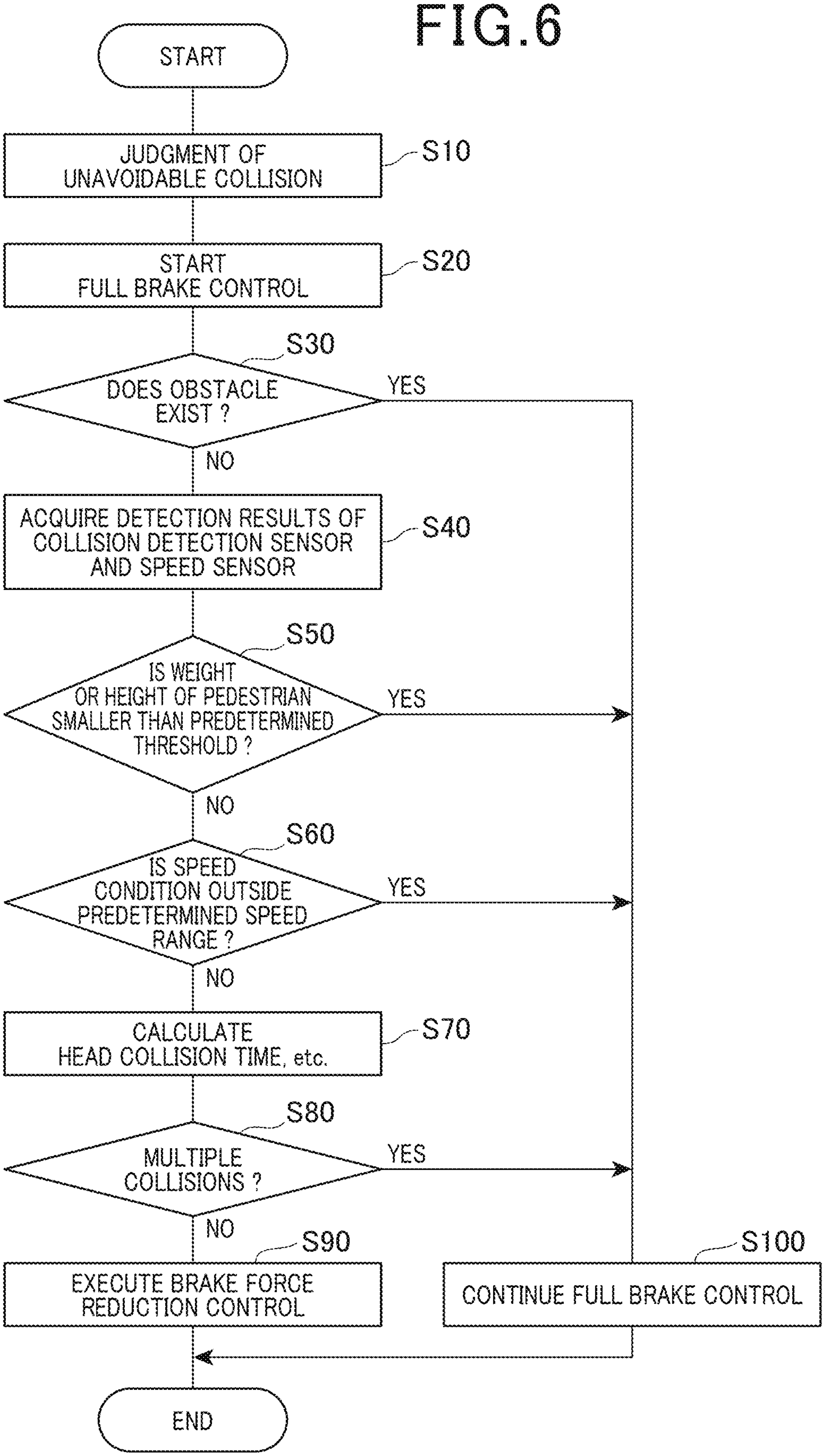
FIG. 6 is a flowchart illustrating brake control processing executed by the pedestrian protection system according to the first embodiment.

Next, brake control processing executed by the pedestrian protection system 1 of the first embodiment will be described with reference to the flowchart of FIG. 6. In the following description and FIG. 6, step is simply denoted as "S".

First, in S10, the brake control determination unit 2 judges whether collision between an object (for example, a pedestrian) present in front of an own vehicle and the own vehicle is unavoidable, based on information input from the peripheral object detection sensor 4. When the brake control determination unit 2 judges that the collision between the object and the own vehicle is unavoidable, it allows the processing to proceed to S20 and instructs the brake control unit 7 to start the full brake control.

Subsequently, in S30, the brake control determination unit 2 determines whether an obstacle is present in a braking distance range of a vehicle when the brake force reduction control is executed in the middle of the full brake control, based on information input from the peripheral object detection sensor 4. In the present specification, an obstacle refers to an object (including a human) that is larger than a certain size and becomes an obstacle to the running of a vehicle. When the obstacle is present, the brake control determination unit 2 allows the processing to proceed to S100 and continuously executes the full brake control. On the other hand, the brake control determination unit 2 allows the processing to proceed to S40 when the obstacle is not present.

Subsequently, in S40, the collision object determination unit 3 acquires, from the collision detection sensor 5, collision force of an object colliding with the front (for example, the front bumper) of a vehicle. Further, the collision object determination unit 3 acquires a vehicle speed at collision from the vehicle speed sensor 6. Then, the collision object determination unit 3 calculates, based on the acquired information, the weight of the pedestrian having collided with the vehicle. Note that the collision object determination unit 3 may estimate the height of the pedestrian from the weight of the pedestrian.

Subsequently, in S50, the collision object determination unit 3 determines whether the weight or height of the pedestrian is smaller than a predetermined threshold. The predetermined threshold is set to a value with which it can be determined whether collision between a vehicle and a pedestrian causes the behavior of the pedestrian jumping up as illustrated in FIG. 3A to FIG. 3D or the behavior of being pushed away toward the front side of a vehicle as illustrated in FIG. 4A and FIG. 4B. The predetermined threshold is previously set by experiment or the like and is stored in a memory. This allows the collision object determination unit 3 to determine whether the pedestrian having collided with a vehicle is an adult-equivalent pedestrian exhibiting the behavior illustrated in FIG. 3A to FIG. 3D or a child-equivalent pedestrian exhibiting the behavior illustrated in FIG. 4A and FIG. 4B.

When the collision object determination unit 3 determines that the weight or height of the pedestrian is smaller than the predetermined threshold (that is, determines that the pedestrian is child-equivalent), it allows the processing to proceed to S100 and continuously executes the full brake control. On the other hand, when the collision object determination unit 3 determines that the weight or height of the pedestrian is larger than the predetermined threshold (that is, determines that the pedestrian is adult-equivalent), it allows the processing to proceed to S60.

Subsequently, in S60, the collision object determination unit 3 determines, based on information acquired from the vehicle speed sensor 6, whether the vehicle speed at collision is outside a predetermined speed range. The predetermined speed range is previously set by experiment or the like as a vehicle speed at which the brake force reduction control effectively acts for pedestrian protection, and is stored in a memory. For example, when the vehicle speed at collision is extremely slow as when the vehicle speed at collision is outside the predetermined speed range, the pedestrian does not exhibit the behavior of being carried on the hood, so that suddenly stopping the vehicle is effective for pedestrian protection. Further, when the vehicle speed at collision is extremely fast as when the vehicle speed at collision is outside the predetermined speed range, the vehicle speed during execution of the brake force reduction control also does not effectively act on pedestrian protection, and suddenly stopping the vehicle is effective for pedestrian protection.

When the collision object determination unit 3 determines that the vehicle speed at collision is outside the predetermined speed range, it allows the processing to proceed to S100 and continuously executes the full brake control. On the other hand, when the collision object determination unit 3 determines that the vehicle speed at collision is within the predetermined speed range, it allows the processing to proceed to S70.

Subsequently, in S70, the collision object determination unit 3 calculates a time at which the head of the pedestrian collides with the hood of the vehicle, and the like, based on the weight or height of the pedestrian detected in S40 and the information on the vehicle speed at collision input from the vehicle speed sensor 6. As the weight or height of the pedestrian is larger and as the vehicle speed at collision is slower, a time period from collision of the leg of the pedestrian with the vehicle to collision of the head with the hood is longer. On the other hand, as the weight or height of the pedestrian is smaller and as the vehicle speed at collision is faster, a time period from collision of the leg of the pedestrian with the vehicle to collision of the head with the hood is shorter.

Further, the collision object determination unit 3 calculates a time at which the body of the pedestrian moves downward from the hood, based on the weight or height of the pedestrian detected in S40. As the weight or height of the pedestrian is larger, a time period from collision of the head of the pedestrian with the hood to movement of the body of the pedestrian downward from the hood is longer. On the other hand, as the weight or height of the pedestrian is smaller, a time period from collision of the head of the pedestrian with the hood to movement of the body of the pedestrian downward from the hood is shorter.

Note that the collision object determination unit 3 may calculate a time at which the weight of the pedestrian is no longer on the hood, instead of calculating a time at which the body of the pedestrian moves downward from the hood.

Since the collision object determination unit 3 can determine a time at which the head of the pedestrian collides with the hood of the vehicle, a time at which the body of the pedestrian moves downward from the hood, and the like by calculation, a configuration such as a load sensor that detects a load to act on the hood can be eliminated.

Figure 7A:
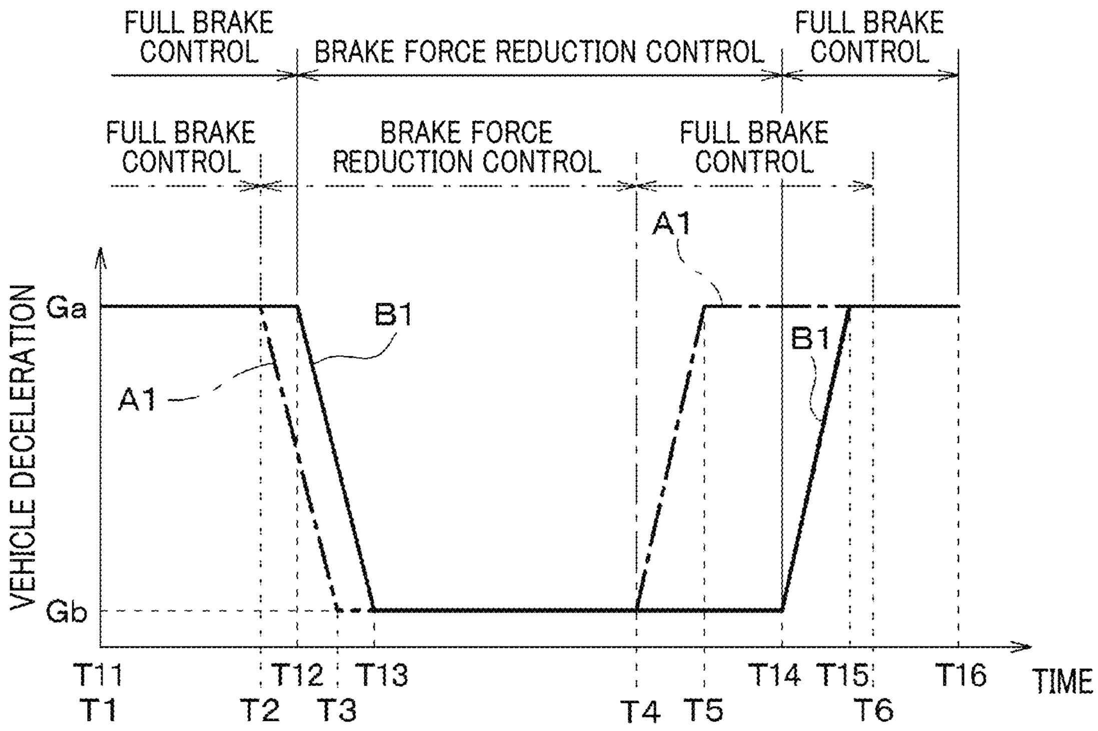
FIG. 7A is a graph illustrating vehicle decelerations when brake force reduction control is executed in the middle of full brake control, corresponding to heights of pedestrians.
Figure 7B:
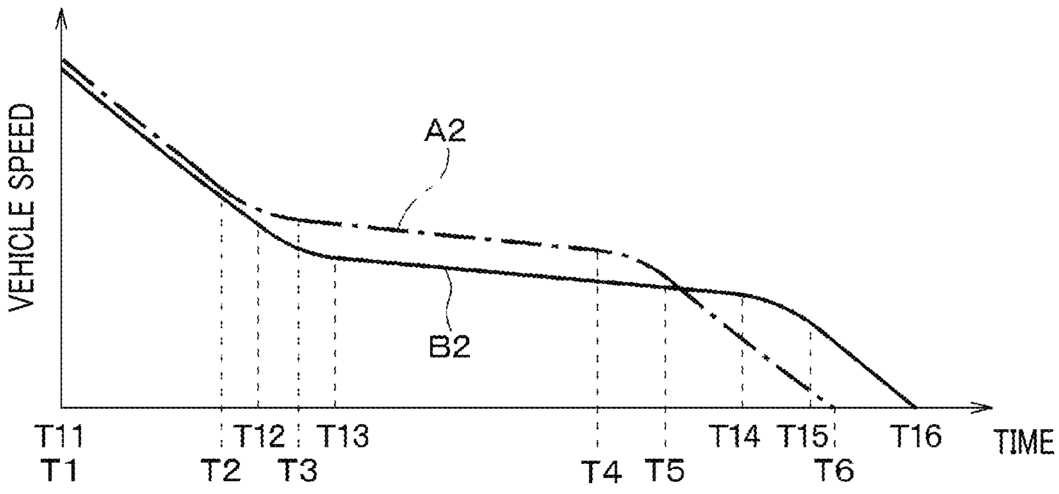
FIG. 7B is a graph illustrating a vehicle speed in FIG. 7A.

Here, FIG. 7A and FIG. 7B illustrate a difference in the brake force reduction control when pedestrians having different weights or heights collide with vehicles. In FIG. 7A and FIG. 7B, a vehicle deceleration by the brake force reduction control when a pedestrian having a relatively small weight or height collides with a vehicle is indicated by dot-dashed line A1 in FIG. 7A, and the vehicle speed at that time is indicated by dot-dashed line A2 in FIG. 7B. Further, a vehicle deceleration by the brake force reduction control when a pedestrian having a relatively large weight or height collides with a vehicle is indicated by solid line B1 in FIG. 7A, and the vehicle speed at that time is indicated by solid line B2 in FIG. 7B.

The dot-dashed line A1 in FIG. 7A and the dot-dashed line A2 in FIG. 7B indicate the vehicle deceleration and vehicle speed when a pedestrian having a relatively small weight or height collides with a vehicle. In this case, the brake force reduction control is started at time T2 and ended at time T4, and the full brake control is executed again from time T4 to T6.

On the other hand, the solid line B1 in FIG. 7A and the solid line B2 in FIG. 7B indicate the vehicle deceleration and vehicle speed when a pedestrian having a relatively large weight or height collides with a vehicle. In this case, the brake force reduction control is started at time T12 and ended at time T14, and the full brake control is executed again from time T14 to T16.

As described above, time T2 and T12 to start the brake force reduction control are set to a time at which the head of the pedestrian is estimated to collide with the hood of the vehicle. Further, times T4 and T14 to end the brake force reduction control and execute the full brake control again are set to a time at which the weight of the pedestrian is estimated to be no longer on the hood or at which the body of the pedestrian is estimated to move downward from the hood.

Time T12 to start the brake force reduction control in the solid lines B1 and B2 is set as a time that is later than time T2 to start the brake force reduction control in the dot-dashed lines A1 and A2, after the leg of the pedestrian collides with the vehicle. Time T14 to execute the full brake control again in the solid lines B1 and B2 is set as a time that is later than time T4 to execute the full brake control again in the dot-dashed lines A1 and A2, after the leg of the pedestrian collides with the vehicle. In this manner, the collision object determination unit 3 sets a time to start the brake force reduction control after the leg of the pedestrian collides with the vehicle and a time to end the brake force reduction control and execute the full brake control again, depending on the weight or height of the pedestrian and the vehicle speed at collision.

Returning to FIG. 6 again, the collision object determination unit 3 subsequently determines in S80 whether so-called multiple collisions in which a plurality of pedestrians collide with a vehicle occurred, from the information acquired from the collision detection sensor 5. Specifically, the collision object determination unit 3 determines that multiple collisions occurred when collision of an object to a vehicle was detected multiple times with a time difference by the collision detection sensor 5.

When the collision object determination unit 3 determines that multiple collisions occurred, it allows the processing to proceed to S100 and continuously execute the full brake control. On the other hand, when the collision object determination unit 3 determines that multiple collisions have not occurred, it allows the processing to proceed to S90.

In S90, the brake control determination unit 2 instructs the brake control unit 7 to execute the brake force reduction control at a time set in S70. According to the instruction from the brake control determination unit 2, the brake control unit 7 executes the brake force reduction control. Note that, as described above, the brake force reduction control is executed from a time at which the head of the pedestrian collides with the hood calculated in S70 to a time at which the weight of the pedestrian is no longer on the hood or a time at which the body of the pedestrian moves downward from the hood. Thereafter, the brake force reduction control is cancelled, and the full brake control is concurrently executed again to stop the vehicle.

The pedestrian protection system 1 of the first embodiment described above exerts the following working effects.

(1) In the first embodiment, the brake control determination unit 2 determines to execute the brake force reduction control in the middle of the full brake control and issues an instruction to the brake control unit 7, when an adult-equivalent pedestrian and a vehicle collide. On the other hand, the brake control determination unit 2 determines to continuously execute the full brake control without executing the brake force reduction control, when a child-equivalent pedestrian and a vehicle collide.

Accordingly, when an adult-equivalent pedestrian and a vehicle collide during execution of the full brake control, the brake force reduction control is executed so that the vehicle moves forward in a state in which the vehicle deceleration is eased. As a result, the body of the pedestrian exhibiting the behavior of jumping up at collision is carried on a hood and caught by the hood, and the posture of the pedestrian is retained. Therefore, when the pedestrian falls on a road surface from the hood, the pedestrian is highly likely to safely fall in a manner other than head first on the road surface. Thus, this pedestrian protection system 1 can protect the adult-equivalent pedestrian from road surface injury.

On the other hand, when a child-equivalent pedestrian and a vehicle collide during execution of the full brake control, the brake force reduction control is not executed, and the vehicle suddenly stops by full brake control. This can prevent the child-equivalent pedestrian having exhibited the behavior of being pushed away toward the front side of the vehicle at collision from being run over. In this manner, the pedestrian protection system 1 can protect both the adult-equivalent pedestrian and the child-equivalent pedestrian by the brake control of the vehicle.

(2) In the first embodiment, the brake control determination unit 2 determines to execute the brake force reduction control and issues an instruction to the brake control unit 7, when an obstacle is not detected in the braking distance range of the vehicle when the brake force reduction control is executed. On the other hand, the brake control determination unit 2 determines to continuously execute the full brake control without executing the brake force reduction control, when an obstacle is detected in the braking distance range of the vehicle when the brake force reduction control is executed.

Accordingly, when an obstacle is present in the braking distance range of the vehicle when the brake force reduction control is executed, a secondary accident in which the obstacle (for example, another pedestrian or the like) and the vehicle collide may occur. Therefore, this pedestrian protection system 1 executes the brake force reduction control when an obstacle is not detected in the braking distance range of the vehicle, which can prevent a secondary accident (that is, collision between another pedestrian or the like and the vehicle) caused by the brake force reduction control.

(3) In the first embodiment, the collision object determination unit 3 calculates the weight of the pedestrian having collided with the vehicle, from the vehicle speed at collision detected by the vehicle speed sensor 6 and the collision force at collision of the object detected by the collision detection sensor 5.

Accordingly, the collision object determination unit 3 can accurately calculate the weight of the pedestrian having collided with the vehicle, based on the output of the vehicle speed sensor 6 and the output of the collision detection sensor 5.

(4) In the first embodiment, the brake control determination unit 2 determines to continuously execute the full brake control without executing the brake force reduction control, when collision of an object to a vehicle is detected multiple times with a time difference by the collision detection sensor 5.

Accordingly, in a case of so-called multiple collisions in which a plurality of pedestrians collide with a vehicle, the behaviors of the pedestrians may differ, and there is a possibility in which the brake force reduction control may not effectively act on any of the pedestrians. Therefore, when a plurality of pedestrians collide with a vehicle, the vehicle is suddenly stopped by the full brake control without executing the brake force reduction control, which can prevent any pedestrian from being put in danger.

(5) In the first embodiment, the brake control determination unit 2 lengthens a certain time period in which the brake force reduction control is executed and delays a time to cancel the brake force reduction control and execute the full brake control again, as the weight or height of the pedestrian detected by the collision object determination unit 3 is larger.

According to this, it is estimated that as the weight of the pedestrian is heavier, the height is higher. The higher the height of a pedestrian, the longer a time from collision between a vehicle and a pedestrian to a time at which the body of the pedestrian is carried on a hood and at which the posture of the pedestrian is retained. Therefore, the brake control determination unit 2 sets a time period in which the brake force reduction control is executed depending on the weight or height of the pedestrian, so that various pedestrians having different physiques can be protected from road surface injury and further prevented from being run over after falling on a road surface.

(6) In the first embodiment, the brake control determination unit 2 determines to execute the brake force reduction control and issues an instruction to the brake control unit 7, when the vehicle speed at collision is within the predetermined speed range. On the other hand, the brake control determination unit 2 determines to continuously execute the full brake control without executing the brake force reduction control, when the vehicle speed at collision is outside the predetermined speed range.

Accordingly, when the vehicle speed at collision is extremely slow, the pedestrian does not exhibit the behavior of being carried on the hood, and suddenly stopping the vehicle may be effective for pedestrian protection. On the other hand, when the vehicle speed at collision is extremely fast, the vehicle speed during execution of the brake force reduction control does not effectively act for pedestrian protection, and suddenly stopping the vehicle may also be effective for pedestrian protection. Therefore, the brake control determination unit 2 can reliably protect a pedestrian by executing the brake force reduction control only when the vehicle speed at collision is within the predetermined speed range in which the pedestrian protection is effective.

Modified Example of First Embodiment

A modified example of the first embodiment will be described. In the above-described first embodiment, an example in which the vehicle deceleration during execution of the brake force reduction control is a constant value has been described. On the other hand, in a modified example of the first embodiment, an example in which the vehicle deceleration is varied during execution of the brake force reduction control will be described.

Figure 8A:
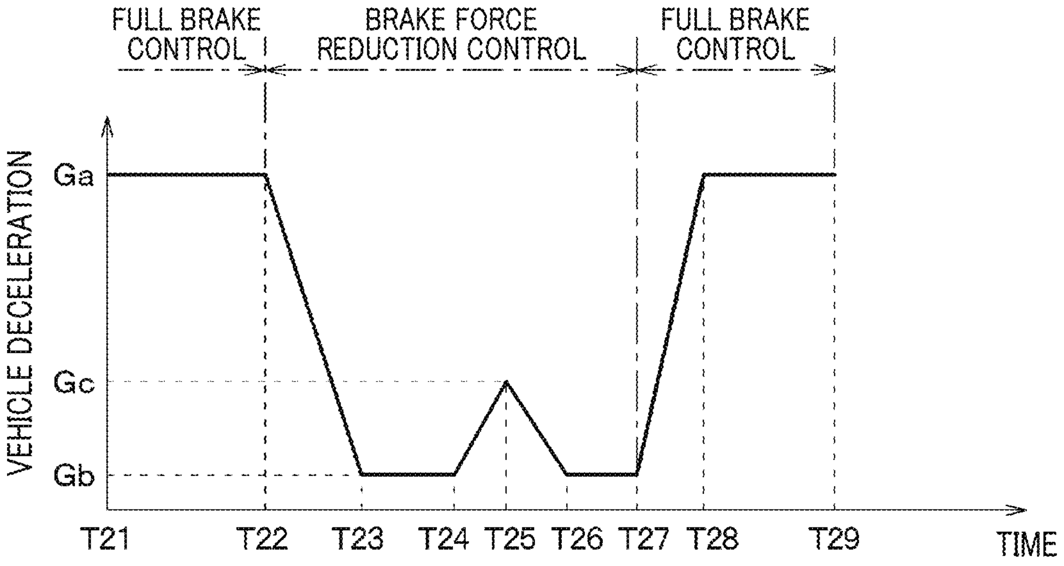
FIG. 8A is a graph illustrating another example of a vehicle deceleration when brake force reduction control is executed in the middle of full brake control in a modified example of the first embodiment.
Figure 8B:
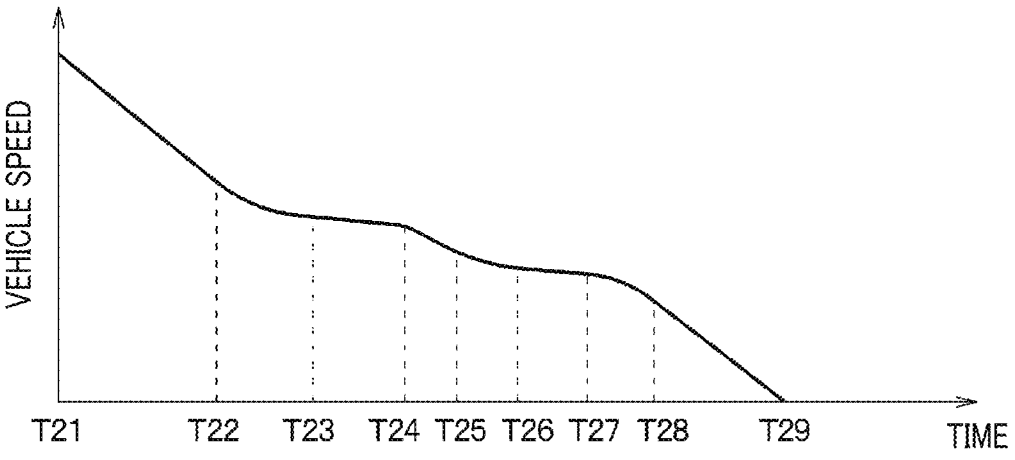
FIG. 8B is a graph illustrating a vehicle speed in FIG. 8A.

For example, as illustrated in FIG. 8A, when the brake force reduction control is started at time T22 after time T21 in the middle of the full brake control, the vehicle deceleration decreases (that is, the vehicle deceleration is eased) from maximum value Ga to Gb from time T22 to T23. Thereafter, the vehicle deceleration increases from Gb to Gc over time T24 to T25 and decreases from Gc to Gb again over time T25 to T26. Then, the brake force reduction control ends at time T27, and the full brake control is executed. Accordingly, the vehicle deceleration increases over time T27 to T28 and thereafter maintains maximum value Ga until the vehicle stops at time T29. As illustrated in FIG. 8B, the vehicle speed changes corresponding to the vehicle deceleration.

As in the above-described modified example of the first embodiment, the vehicle deceleration can be also changed during execution of the brake force reduction control. FIG. 8A and FIG. 8B illustrate an example of the brake force reduction control. The brake force reduction control is not limited to this example, and the vehicle deceleration can be variously changed. For example, the vehicle deceleration may be changed corresponding to a change in the position of the pedestrian carried on the hood or corresponding to a change in the load acting on the hood.

Second Embodiment

A second embodiment will be described. The second embodiment is obtained by partly changing the pedestrian protection system 1 of the first embodiment and is otherwise the same as the first embodiment. Therefore, only a different portion from the first embodiment will be described.

Figure 9:
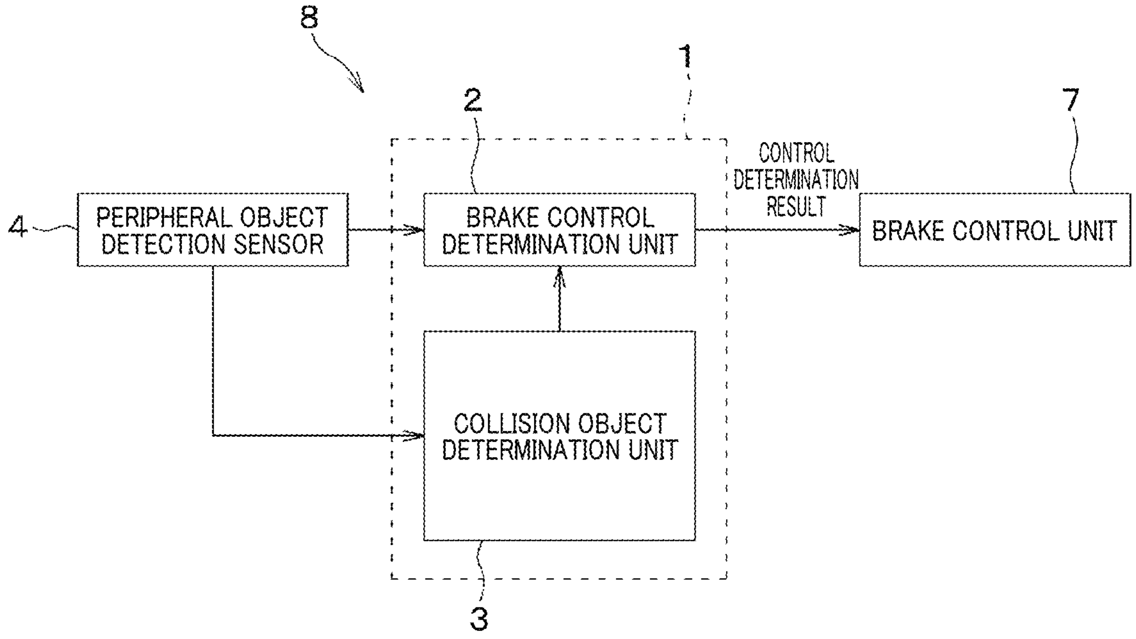
FIG. 9 is a block diagram illustrating a vehicle configuration including a pedestrian protection system according to a second embodiment.

As illustrated in FIG. 9, a pedestrian protection system 1 of the second embodiment does not include the collision detection sensor 5 described in the first embodiment. Image data captured by a camera as the peripheral object detection sensor 4 is input to the brake control determination unit 2 and the collision object determination unit 3. The collision object determination unit 3 can detect the height of the pedestrian or the like by image-analyzing the image data captured by the camera. Therefore, the brake control determination unit 2 can determine whether the pedestrian having collided with the vehicle is an adult-equivalent pedestrian or a child-equivalent pedestrian by the height of the pedestrian detected by the collision object determination unit 3.

The collision object determination unit 3 may detect a time at which the leg of the pedestrian and the vehicle collide or a time at which the head of the pedestrian and the hood collide, by image-analyzing the image data captured by the camera.

The above-described pedestrian protection system 1 of the second embodiment can also exert the same working effects as the first embodiment.

Modified Example of Second Embodiment

A modified example of the second embodiment will be described. The modified example of the second embodiment is a combination of the first embodiment and the second embodiment. Although unillustrated, the modified example of the second embodiment may include, in addition of the configuration of the second embodiment illustrated in FIG. 9, the collision detection sensor 5 described in the first embodiment. Accordingly, the collision object determination unit 3 may detect a time at which the pedestrian and the vehicle collide, by the information input from the collision detection sensor 5.

Further, the modified example of the second embodiment may be configured such that speed information from the vehicle speed sensor 6 is input to the collision object determination unit 3, in addition to the configuration of the second embodiment illustrated in FIG. 9. Accordingly, the collision object determination unit 3 may calculate a time at which the head of the pedestrian and the hood collide, in the same manner as in the first embodiment.

OTHER EMBODIMENTS (1) In the above-described embodiments, the brake control determination unit 2 and the collision object determination unit 3 have been described as separate electronic control devices, but are not limited thereto. For example, the brake control determination unit 2 and the collision object determination unit 3 may be configured as one electronic control device.

(2) Further, in the above-described embodiments, the brake control determination unit 2, the collision object determination unit 3, and the brake control unit 7 have been described as separate electronic control devices, but are not limited thereto. For example, the brake control determination unit 2, the collision object determination unit 3, and the brake control unit 7 may be configured as one electronic control device.

(3) In other embodiments, the pedestrian protection system 1 may change the method for the brake force reduction control, depending on the position where the pedestrian collided with the front (for example, the front bumper) of the vehicle. The position where the pedestrian collided with the front bumper can be detected by the collision detection sensor 5 described in the first embodiment.

The present disclosure is not limited to the above-described embodiments, which can be appropriately modified. Further, the above-described embodiments and parts thereof are not mutually exclusive to one another, and can be appropriately combined except for when the combination is apparently unacceptable. Further, it is unnecessary to say that in the above-described embodiments, the elements constituting the embodiments are not necessarily essential except for when particularly specified as being essential or when apparently essential in principle. Further, the above-described embodiments are not limited to the referred specific numerical values such as the number of constituents and the numerical values, amounts, ranges, or the like of the constituents of the embodiments, except for when particularly specified as being essential or when obviously limited to the specific numerical numbers in principle. Further, the above-described embodiments are not limited to the referred shapes, positional relationships, or the like of the constituents, except for when particularly specified or when limited to the specific shapes, positional relationships, or the like in principle.

The control device and the method therefor according to the present disclosure may be achieved by a dedicated computer that is provided by constituting a processor and a memory programmed to execute one or more functions embodied by a computer program. Alternatively, the control device and the method therefor according to the present disclosure may be achieved by a dedicated computer provided by constituting a processor with one or more dedicated hardware logic circuits. Alternatively, the control device and the method therefor according to the present disclosure may be achieved by one or more dedicated computers constituted by a combination of a processor and a memory programmed to execute one or more functions and a processer constituted by one or more hardware logic circuits. The computer program may be stored, as instructions to be executed by a computer, in a computer-readable non-transitory tangible storage medium. The above-described memory is a non-transitory tangible storage medium.

CONFIGURATIONS OF PRESENT DISCLOSURE

The above-described present disclosure can be understood as, for example, the below-described configurations.

First Configuration

A pedestrian protection system to be mounted on a vehicle together with a brake control unit (7) configured to control driving of a brake circuit of the vehicle, comprising:

a brake control determination unit (2) configured to instruct the brake control unit to execute full brake control of increasing a vehicle deceleration to a maximum value in response to detecting that collision between a pedestrian in front of a vehicle and the vehicle is unavoidable; and a collision object determination unit (3) configured to detect a weight or height of the pedestrian colliding with the vehicle, wherein the brake control determination unit is configured to:

determine to execute brake force reduction control of decreasing a vehicle deceleration from a maximum value for a certain time period in the middle of the full brake control and issue an instruction to the brake control unit, when the weight or height of the pedestrian detected by the collision object determination unit is larger than a predetermined threshold, and determine to continuously execute the full brake control without executing the brake force reduction control, when the weight or height of the pedestrian detected by the collision object determination unit is smaller than a predetermined threshold.

Second Configuration

The pedestrian protection system according to the first configuration, in which the vehicle is provided with a peripheral object detection sensor (4) configured to detect an object present in the periphery of a vehicle, and the brake control determination unit is configured to:

determine to execute the brake force reduction control and issue an instruction to the brake control unit, when an obstacle is not detected within a braking distance range when the brake force reduction control is executed based on information from the peripheral object detection sensor, and determine to continuously execute the full brake control without executing the brake force reduction control when the obstacle is detected within the braking distance range when the brake force reduction control is executed based on information from the peripheral object detection sensor.

Third Configuration

The pedestrian protection system according to the first or second configuration, in which the vehicle is provided with a collision detection sensor (5) configured to detect collision force of an object colliding with a front of a vehicle and a vehicle speed sensor (6) configured to detect a vehicle speed, and the collision object determination unit is configured to detect that a weight of the pedestrian having collided with the vehicle is heavier as collision force is larger and as a vehicle speed at collision is slower, from collision force detected by the collision detection sensor and a vehicle speed at collision detected by the vehicle speed sensor.

Fourth Configuration

The pedestrian protection system according to the third configuration, in which the brake control determination unit is configured to determine to continuously execute the full brake control without executing the brake force reduction control, when collision of an object to the vehicle is detected multiple times with a time difference by the collision detection sensor.

Fifth Configuration

The pedestrian protection system according to the second configuration, in which the peripheral object detection sensor contains a camera, and the collision object determination unit is configured to detect a height of the pedestrian from an image captured by the camera.

Sixth Configuration

The pedestrian protection system according to any one of the first to fifth viewpoints, in which the brake force reduction control is control of decreasing a vehicle deceleration from a maximum value for the certain time period in the middle of the full brake control and executing the full brake control again after the certain time period elapsed, and the brake control determination unit is configured to lengthen the certain time period in which the brake force reduction control is executed and delay a time to cancel the brake force reduction control and execute the full brake control again, as the weight or height of the pedestrian detected by the collision object determination unit is larger.

Seventh Configuration

The pedestrian protection system according to any one of the first to sixth configurations, in which the brake control determination unit is configured to:

determine to execute the brake force reduction control and issue an instruction to the brake control unit when a vehicle speed at collision is within a predetermined speed range, and determine to continuously execute the full brake control without executing the brake force reduction control when a vehicle speed at collision is outside a predetermined speed range.

What is claimed is:

1. A pedestrian protection system to be mounted on a vehicle together with a brake control unit configured to control driving of a brake circuit of the vehicle, comprising:

a brake control determination unit configured to instruct the brake control unit to execute full brake control of increasing a vehicle deceleration to a maximum value in response to detecting that collision between a pedestrian in front of a vehicle and the vehicle is unavoidable; and a collision object determination unit configured to detect a weight or height of the pedestrian colliding with the vehicle, wherein the brake control determination unit is configured to:

determine to execute brake force reduction control of decreasing a vehicle deceleration from a maximum value for a certain time period in the middle of the full brake control and issue an instruction to the brake control unit, when the weight or height of the pedestrian detected by the collision object determination unit is larger than a predetermined threshold, and determine to continuously execute the full brake control without executing the brake force reduction control, when the weight or height of the pedestrian detected by the collision object determination unit is smaller than a predetermined threshold.

2. The pedestrian protection system according to claim 1, wherein the vehicle is provided with a peripheral object detection sensor configured to detect an object present in the periphery of a vehicle, and the brake control determination unit is configured to:

determine to execute the brake force reduction control and issue an instruction to the brake control unit, when an obstacle is not detected within a braking distance range when the brake force reduction control is executed based on information from the peripheral object detection sensor, and determine to continuously execute the full brake control without executing the brake force reduction control when the obstacle is detected within the braking distance range when the brake force reduction control is executed based on information from the peripheral object detection sensor.

3. The pedestrian protection system according to claim 1, wherein the vehicle is provided with a collision detection sensor configured to detect collision force of an object colliding with a front of a vehicle and a vehicle speed sensor configured to detect a vehicle speed, and the collision object determination unit is configured to detect that a weight of the pedestrian having collided with the vehicle is heavier as collision force is larger and as a vehicle speed at collision is slower, from collision force detected by the collision detection sensor and a vehicle speed at collision detected by the vehicle speed sensor.

4. The pedestrian protection system according to claim 3, wherein the brake control determination unit is configured to determine to continuously execute the full brake control without executing the brake force reduction control, when collision of an object to the vehicle is detected multiple times with a time difference by the collision detection sensor.

5. The pedestrian protection system according to claim 2, wherein the peripheral object detection sensor contains a camera, and the collision object determination unit is configured to detect a height of the pedestrian from an image captured by the camera.

6. The pedestrian protection system according to claim 1, wherein the brake force reduction control is control of decreasing a vehicle deceleration from a maximum value for the certain time period in the middle of the full brake control and executing the full brake control again after the certain time period elapsed, and the brake control determination unit is configured to lengthen the certain time period in which the brake force reduction control is executed and delay a time to cancel the brake force reduction control and execute the full brake control again, as the weight or height of the pedestrian detected by the collision object determination unit is larger.

7. The pedestrian protection system according to claim 1, wherein the brake control determination unit is configured to:

determine to execute the brake force reduction control and issue an instruction to the brake control unit when a vehicle speed at collision is within a predetermined speed range, and determine to continuously execute the full brake control without executing the brake force reduction control when a vehicle speed at collision is outside a predetermined speed range.

* * * * *